United States Patent

Yamada et al.

[11] Patent Number: 5,133,302
[45] Date of Patent: Jul. 28, 1992

[54] ELECTRIC MOTOR FAN CONTROL SYSTEM FOR VEHICLE

[75] Inventors: Naoki Yamada, Tokyo; Yasushi Yamamoto, Kanagawa, both of Japan

[73] Assignee: Nissan Motor Co., Ltd., Yokohama, Japan

[21] Appl. No.: 759,364

[22] Filed: Sep. 13, 1991

[30] Foreign Application Priority Data

Sep. 18, 1990 [JP] Japan .................................. 2-247990

[51] Int. Cl.[5] .............................................. F01P 7/02
[52] U.S. Cl. .................................................. 123/41.12
[58] Field of Search ........................ 123/41.12, 41.49

[56] References Cited

U.S. PATENT DOCUMENTS

| | | | |
|---|---|---|---|
| 4,425,766 | 1/1984 | Claypole | 123/41.12 |
| 4,590,772 | 5/1986 | Nose et al. | 123/41.12 |
| 4,651,922 | 3/1987 | Noba | 123/41.12 |
| 4,765,284 | 8/1988 | Kanazawa et al. | 123/41.12 |
| 5,018,484 | 5/1991 | Naitoh | 123/41.12 |

Primary Examiner—Noah P. Kamen
Attorney, Agent, or Firm—Pennie & Edmonds

[57] ABSTRACT

A fan control system of a vehicle for controlling an electric motor fan for cooling a radiator for an engine coolant and a condenser for a refrigerant of an air conditioning system of the vehicle by moving air, comprises a vehicle speed sensor, a sensor for sensing the temperature of the engine coolant, a sensor for sensing a discharge pressure of the refrigerant discharged from the compressor of the air conditioning system, and a controller for controlling the motor fan. In the operating range in which the vehicle speed is lower than a predetermined speed and simultaneously the coolant temperature is lower than a predetermined temperature, the controller holds the motor fan off if the discharge pressure is lower than a predetermined pressure even though the air conditioner switch is on. Therefore, the percentage of running time of the motor fan to the total time is reduced.

11 Claims, 5 Drawing Sheets

| VEHICLE SPEED (km/h) | A/C SWITCH SW1 | PRESSURE SWITCH SW2 | WATER TEMPERATURE | | |
|---|---|---|---|---|---|
| | | | 95 | 100 | 105 (°C) |
| 0 ~ 19 | OFF | — | OFF | LOW | HIGH |
| | ON | OFF | OFF | LOW | HIGH |
| | | ON | LOW | | HIGH |
| 20 ~ 79 | OFF | — | OFF | LOW | HIGH |
| | ON | OFF | OFF | LOW | HIGH |
| | | ON | LOW | | HIGH |
| 80 ~ | OFF | — | OFF | | HIGH |
| | ON | OFF | OFF | | HIGH |
| | | ON | OFF | | HIGH |

| VEHICLE SPEED (km/h) | A/C SWITCH | WATER TEMPERATURE | | |
|---|---|---|---|---|
| | | 95 | 100 | 105 (°C) |
| 0 ~ 19 | OFF | OFF | LOW | HIGH |
| | ON | LOW | | HIGH |
| 20 ~ 79 | OFF | OFF | LOW | HIGH |
| | ON | LOW | | HIGH |
| 80 ~ | OFF | OFF | | HIGH |
| | ON | OFF | | HIGH |

ELECTRIC MOTOR FAN CONTROL SYSTEM FOR VEHICLE

BACKGROUND OF THE INVENTION

The present invention relates to a control system for controlling an electric motor fan of a vehicle such as a motor vehicle.

FIG. 5 shows one conventional fan control system for a passenger car (as disclosed in "NISSAN *Shingatasha Kaisetsusho* (new model maintenance manual)", Vol. U12-2, pages B-48 and B-95, Oct. 1989). This system includes a vehicle speed sensor 1, a temperature sensor 2 for sensing the temperature of an engine cooling water, an air conditioner switch SW1, and a control circuit 3 for controlling electric fan motors M1 and M2 for moving air toward a radiator of the engine coolant and a condenser of an air conditioning system, through motor relays Ry1 and Ry2.

When the vehicle is in motion, the radiator and condenser receive a flow of cool outside air due to the vehicle motion. Therefore, the control system stops the fan motors M1 and M2 when the vehicle speed is higher than 80 km/h and the engine cooling water temperature is lower than 105° C., as shown in FIG. 6. When the vehicle speed is lower than 80 km/h and the water temperature is lower than 95° C., this control system turns off the motors M1 and M2 if the air conditioner switch SW1 is off. When the air conditioner switch SW1 is on, a clutch for an air conditioning compressor is engaged, and the air conditioning system is in an operative state. Therefore, this control system runs the motors M1 and M2, regardless of the vehicle speed and the water temperature, when the air conditioning system is working.

SUMMARY OF THE INVENTION

It is an object of the present invention to provide a vehicle electric motor fan control system which can operate an electric motor fan more efficiently.

According to the preset invention, a fan control system for a vehicle comprises a cooling means, four sensing means and a controller means.

The cooling means comprises an air-cooled heat exchanger system for removing heat from an engine coolant for cooling an engine of the vehicle and a refrigerant of an air conditioning system of the vehicle. The cooling means further comprises an electric motor fan for cooling the heat exchanger system by directing air to the heat exchanger system. In an illustrated embodiment of the invention, the heat exchanger system comprises a heat exchanger in the form of a radiator for the engine coolant, and another heat exchanger in the form of a condenser for the air conditioning refrigerant. The cooling means may include the whole of the engine cooling system and the whole of the air conditioning system.

Among the four sensing means, the first one is a means for sensing a vehicle speed. The second sensing means is a means for sensing a cooling power of the engine coolant. In the illustrated embodiment of the invention, the second sensing means is a temperature sensing means for sensing the temperature of the engine coolant. The third sensing means is a means for determining whether the air conditioning system is in an operative state or in an inoperative state. In the illustrated embodiment of the invention, an air conditioner switch SW1 serves as the third sensing means. The fourth sensing means is a means for sensing a discharge pressure of the refrigerant discharged from a compressor of the air conditioning system. In the illustrated embodiment, the fourth sensing means takes the form of a pressure switch SW2.

The controller means switches off the motor fan and holds the motor fan in the off state if the discharge pressure is lower than a predetermined pressure value, regardless of whether the air conditioning system is in the operative state or not, when the vehicle speed is lower than a predetermined first speed value (80 km/h, for example) and the cooling power of the engine coolant is higher than the a predetermined value.

The compressor of the air conditioning system acts to circulate the refrigerant in the refrigeration cycle. The pressure of the gas refrigerant is low on the inlet side of the compressor, and high on the discharge outlet side. The refrigerant pressure on the discharge side of the compressor becomes higher as the rotational speed of the compressor (i.e. the engine speed) becomes higher, the temperature of air flowing through the evaporator becomes higher, and the amount of airflow produced by a blower fan becomes greater. In other words, the refrigerant discharge pressure of the compressor is proportional to the heat load of the passenger compartment of the vehicle. The discharge pressure is increased as the heat load increases, and decreased as the heat load decreases. The refrigerant discharge pressure becomes minimum when the heat load continues to be low. In this case, therefore, the control system according to the present invention ceases the air cooling of the condenser by stopping the motor fan. When the discharge pressure is low, the motor fan is held in the off state even if the air conditioner switch is turned on. Thus, the present control system can reduce the running time of the motor fan.

DETAILED DESCRIPTION OF THE INVENTION

Figures 2, 4:
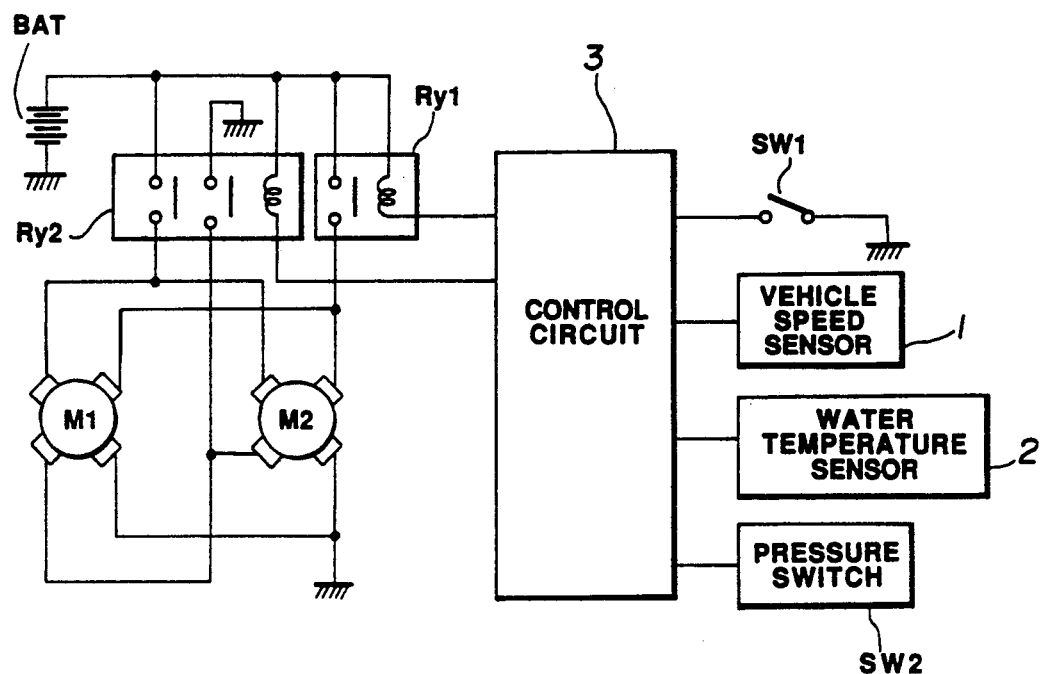
FIG. 2 is a block diagram showing an electric motor fan control system according to the embodiment of the present invention more concretely.
FIG. 4 is a table listing states of the motor fan controlled by the control system according to the embodiment in various operating conditions.

A fan control system according to one embodiment of the present invention is shown in FIGS. 2-4.

As shown in FIG. 2, the fan control system for a vehicle includes an air conditioner switch SW1 for switching on and off an air conditioning system of the vehicle, a vehicle speed sensor 1 for sensing the speed V of the vehicle, a water temperature sensor 2 for sensing the temperature T of an engine cooling water, and a pressure switch SW2.

In this embodiment, the vehicle speed sensor 1 serves as a first sensing means 101 (shown in FIG. 1) for sensing the vehicle speed, and the water temperature sensor 2 serves as a second sensing means 102 (shown in FIG. 1) for sensing a cooling power of the engine coolant. The air conditioner switch SW1 serves as a third sensing means 103 (shown in FIG. 1) for determining whether the air conditioning system of the vehicle is in an operative state or in an inoperative state, and for producing a first switch-on signal when the air conditioning system is in the operative state and a first switch-off signal when the air conditioning system is in the inoperative state. The pressure switch SW2 serves as a fourth sensing means 104 (shown in FIG. 1) for sensing a discharge pressure of a refrigerant.

The pressure switch SW2 is provided at an outlet of a compressor 131 (shown in FIG. 1) of the air conditioning system, and constructed to sense the pressure Pd of a refrigerant discharged from the compressor 131. The pressure switch SW2 of this embodiment is in an off state to produce a second switch-off signal when the refrigerant discharge pressure Pd is equal to or lower than a predetermined pressure value K. When the refrigerant discharge pressure Pd is higher than the predetermined value K, the pressure switch SW2 is put in an on state, and produces a second switch-on signal.

The control system further includes a control circuit 3 which receives signals from the air conditioner switch SW1, the vehicle speed sensor 1, the water temperature sensor 2 and the pressure switch SW2, and which controls fan motors M1 and M2. The control circuit 3 of this embodiment is composed of a microcomputer mounted on the vehicle, and peripheral components. The motors M1 and M2 are connected with a battery BAT through first and second relays Ry1 and Ry2. When the first relay Ry1 is on, then the motors M1 and M2 are driven at a low speed (LOW) with power supplied from the battery BAT. The control circuit 3 can drive the motors M1 and M2 at a high speed (HIGH) by further turning on the second relay Ry2. The control circuit 3 serves as a controller means 105 (shown in FIG. 1) for controlling the fan motors M1 and M2 in accordance with signals supplied from the switches SW1 and SW2 and the sensors 1 and 2.

Figure 3A:
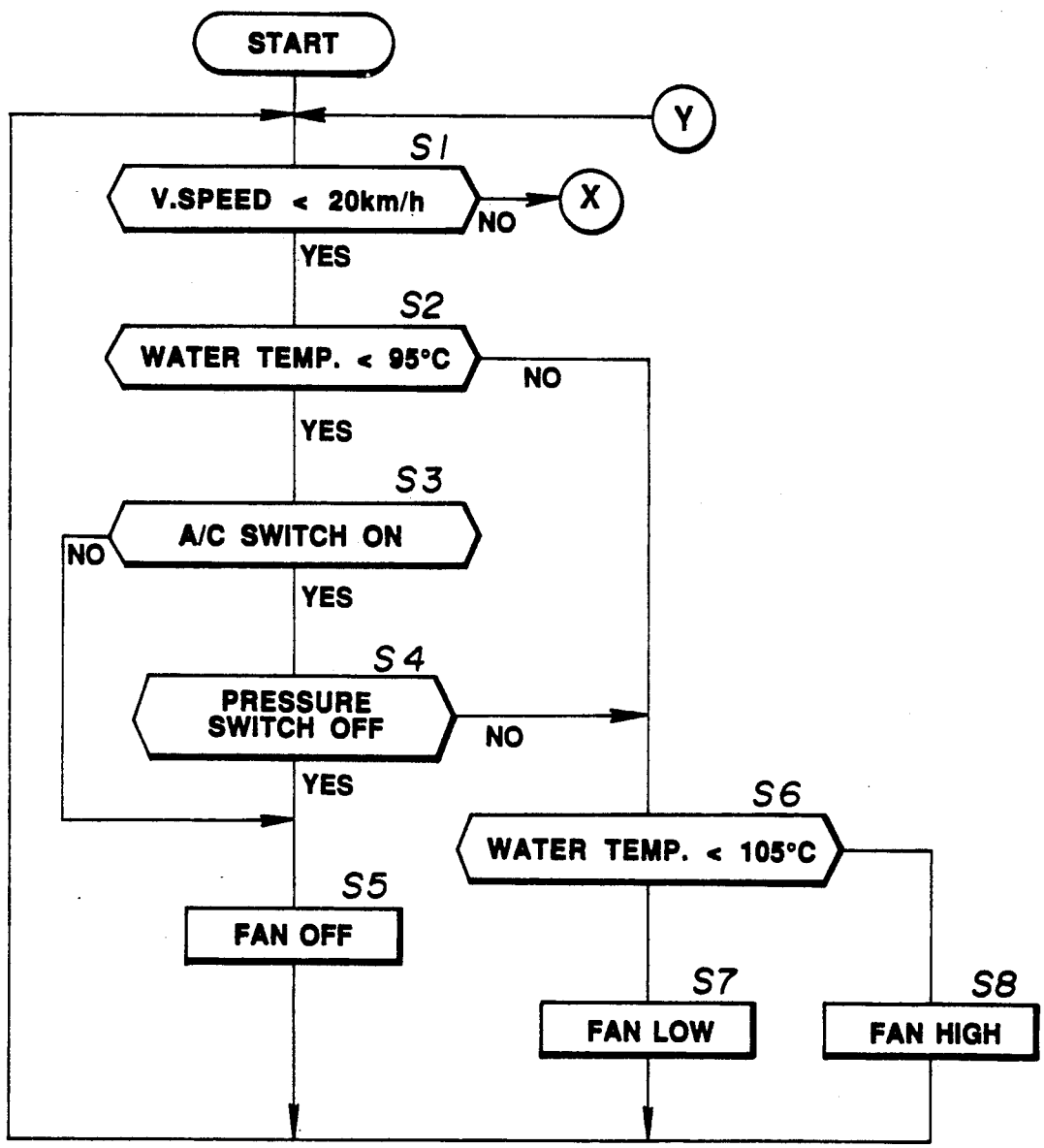
FIGS. 3A and 3B shows a control program performed by a control circuit 3 shown in FIG. 2.
Figure 3B:
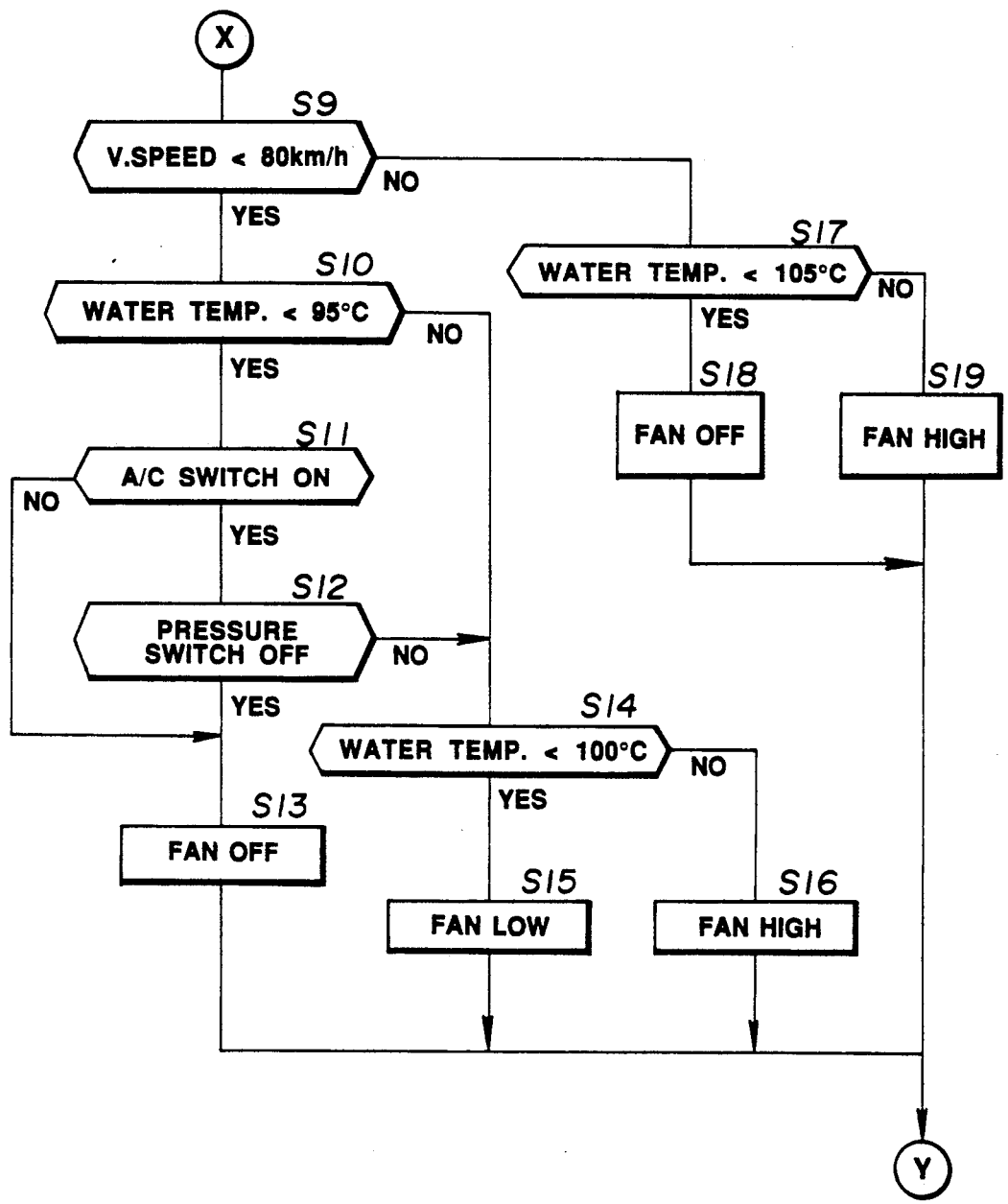
Figures 5, 6:
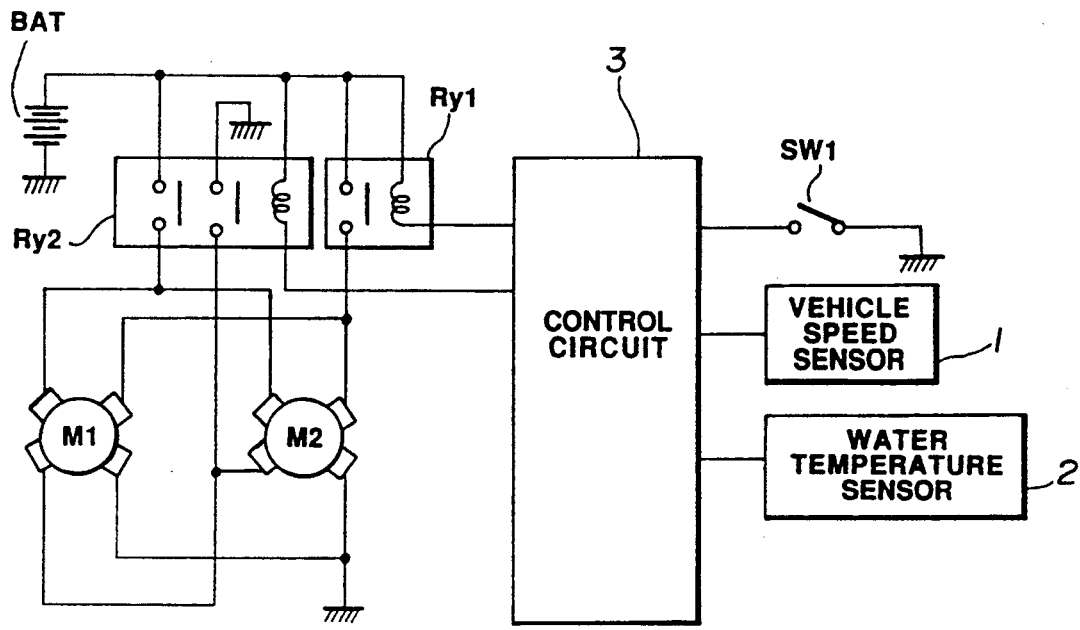
FIG. 5 is a block diagram showing a conventional fan control system.
FIG. 6 is a table showing operations of the conventional fan control system.

The control circuit 3 of this embodiment performs a fan control program shown in FIGS. 3A and 3B.

At a step S1 shown in FIG. 3A, the control circuit 3 determines whether the vehicle speed V sensed by the vehicle speed sensor 1 is lower than 20 km/h (which is a predetermined second speed value) or not. From the step S1, the control circuit 3 proceeds to a step S2 if V <20 km/h, and to a step S9 shown in FIG. 3B through a first connector point X if it is not.

At the step S2, the control circuit 3 determines whether the water (coolant) temperature T sensed by the water temperature sensor 2 is lower than 95° C. (which is a first temperature value) or not. The control circuit 3 proceeds to a step S3 if T <95° C., and to a step S6 if it is not.

At the step S3, the control circuit 3 determines whether the air conditoner switch SW1 is on or not. Then, the control circuit 3 proceeds to a step S4 if the air conditioner switch SW1 is on, and to a step S5 if the air conditioner switch SW1 is off.

At the step S4, the control circuit 3 determines whether the refrigerant discharge pressure Pd is equal to or lower than the predetermined value K, or not, by checking the signal from the pressure switch SW2. If Pd ≦ K, the control circuit 3 proceeds to the step S5.

At the step S5, the control circuit 3 stops, or hold stationary, the fan motors M1 and M2 by turning off the first relay Ry1. The control circuit 3 of this embodiment produces a fan control signal in an off control state to switch off the motors M1 and M2 at the step S5.

When the answer of the step S2 or step S4 is negative, then the control circuit 3 proceeds to the step S6, and determines there whether the water temperature T is lower than 105° C. (which is a predetermined third temperature value). If T <105° C., then the control circuit 3 switches on the first relay Ry1 at a step S7, and by so doing, drives the motors M1 and M2 at a low speed. At the step S7, the control circuit 3 produces the fan control signal which is in a first on control state to drive the motors M1 and M2 at the low speed. If the water temperature T is equal to or higher than 105° C., then the control circuit 3 drives the motors M1 and M2 at a high speed by turning on the first and second relays Ry1 and Ry2 at a step S8. At the step S8, the control circuit 3 produces the fan control signal which is in a second on control state to drive the fan motors M1 and M2 at the high speed.

If the vehicle speed V is equal to or higher than 20 km/h, then the control circuit 3 proceeds from the step S1 to the step S9 to determine whether the vehicle speed V is lower than 80 km/h (which is a first predetermined speed value), or not. Then, the control circuit 3 proceeds from the step S9 to a step S10 if V <80 km/h, and from the step S9 to a step S17 if V ≧80 km/h.

At the step S10, the control circuit 3 determines whether the water temperature T is lower than 95° C. (first temperature value) or not. Then, the control circuit 3 proceeds to a step S11 if T <95° C., and to a step S14 if T ≧95° C. At the step S11, the control circuit 3 determines whether the air conditioner switch SW1 is in the on state or not. From the step S11, the control circuit 3 proceeds to a step S12 if SW1 is on, and to a step S13 if it is not.

At the step S12, the control circuit 3 checks the output signal of the pressure switch SW2 and determines whether the discharge pressure Pd of the refrigerant is equal to or lower than the predetermined pressure value K. If it is, the control circuit 3 proceeds to the step S13 and produces the fan control signal in the off control state to stop the motors M1 and M2. If Pd >K, then the control circuit 3 proceeds to the step S14.

If the answer of the step S10 or S12 is negative, the control circuit 3 reaches the step S14, and determines whether the water temperature is lower than 100° C. (a second predetermined temperature value), or not. From the step S14, the control circuit 3 proceeds to a step S15 to drive the motors M1 and M2 at the low speed if T <100° C., and to a step S16 to drive the motors M1 and M2 at the high speed if T ≧100° C.

If the vehicle speed is equal to or higher than 80 km/h (the first speed value), then the control circuit 3 proceeds from the step S9 to a step S17 to determine whether the water temperature is lower than 105° C. (a third temperature value), or not. From the step S17, the control circuit 3 proceeds to a step S18 to stop the motors M1 and M2 if T <105° C., and to a step S19 to drive the motors M1 and M2 at the high speed if T ≧105° C.

Thereafter, the control circuit 3 returns to the step S1 to repeat the program.

FIG. 4 shows the operations of the control system according to this embodiment of the present invention.

When the vehicle speed V is lower than the first predetermined speed value (80 km/h) and simultaneously the water temperature T of the engine cooling water is lower than the first temperature value (95° C.), the control circuit 3 holds the fan motors M1 and M2 off if either or both of the switches SW1 and SW2 is off, and switches on the fan motors M1 and M2 only if both switches SW1 SW2 are on. Therefore, the controller means 105 (shown in FIG. 1) of this embodiment corresponding to the control circuit 3 comprises a discriminationg means 105b (shown by broken line in FIG .1) for producing a discrimination signal only when the vehicle speed is lower than the first speed value (80 km/h) and simultaneously the water temperature is lower than the first temperature value (95° C.), and a (AND) logic operating means 105a (shown by a broken line in FIG. 1) for holding the fan control signal in the off control state if at least one of the switches SW1 and SW2 is off when the discriminating signal is present. When the vehicle speed V is higher than the first speed value (80 km/h) or the water temperature T is higher than the first temperature value (95° C.), the control circuit 3 produces the fan control signal independently of the switches SW1 and SW2. Therefore, the control circuit 3 of this embodiment comprises a second operating means for producing the fan control signal independently of the switches SW1 and SW2. In the example shown in FIG. 1, the discriminating means 105b includes the second operating means. Therefore, the discriminating means 105b is connected with the first and second sensing means 101 and 102, and produces the discrimination signal and the fan control signal in accordance with the vehicle speed and the coolant temperature. The logic operating means 105a receives the output signals of the air conditioner switch SW1 and the pressure switch SW2, and produces the fan control signal by functioning like an AND gate only when the discrimination signal is present.

In this way, the control system of this embodiment holds the fan motors M1 and M2 in the off state even if the air conditioner switch SW1 is switched on, as long as the refrigerant discharge pressure Pd is equal to or lower than the predetermined value when the vehicle speed is in the medium or low range and the engine coolant temperature is low. Therefore, this control system can reduce the percentage of working time to total time of the motors M1 and M2, and improve the durability, and the vibration and noise reducing characteristics of the fan motors.

This embodiment employs a three step control system in which the fan speed assumes one of three discrete values which are zero, a predetermined low speed and a predetermined high speed. However, it is optional to employ an on-off control system in which the fan motor is turned on or off. For example, the fan speed is always equal to a high speed when the motor is switched on.

In the illustrated embodiment, the engine is a water-cooled type. However, the cooling system of an engine used in the present invention may be arranged to utilize the latent heat of vaporization of a coolant such as alcohol. The compressor of the air conditioning system may be a constant displacement (or capacity) type or may be a variable displacement (capacity) type.

Figure 1:
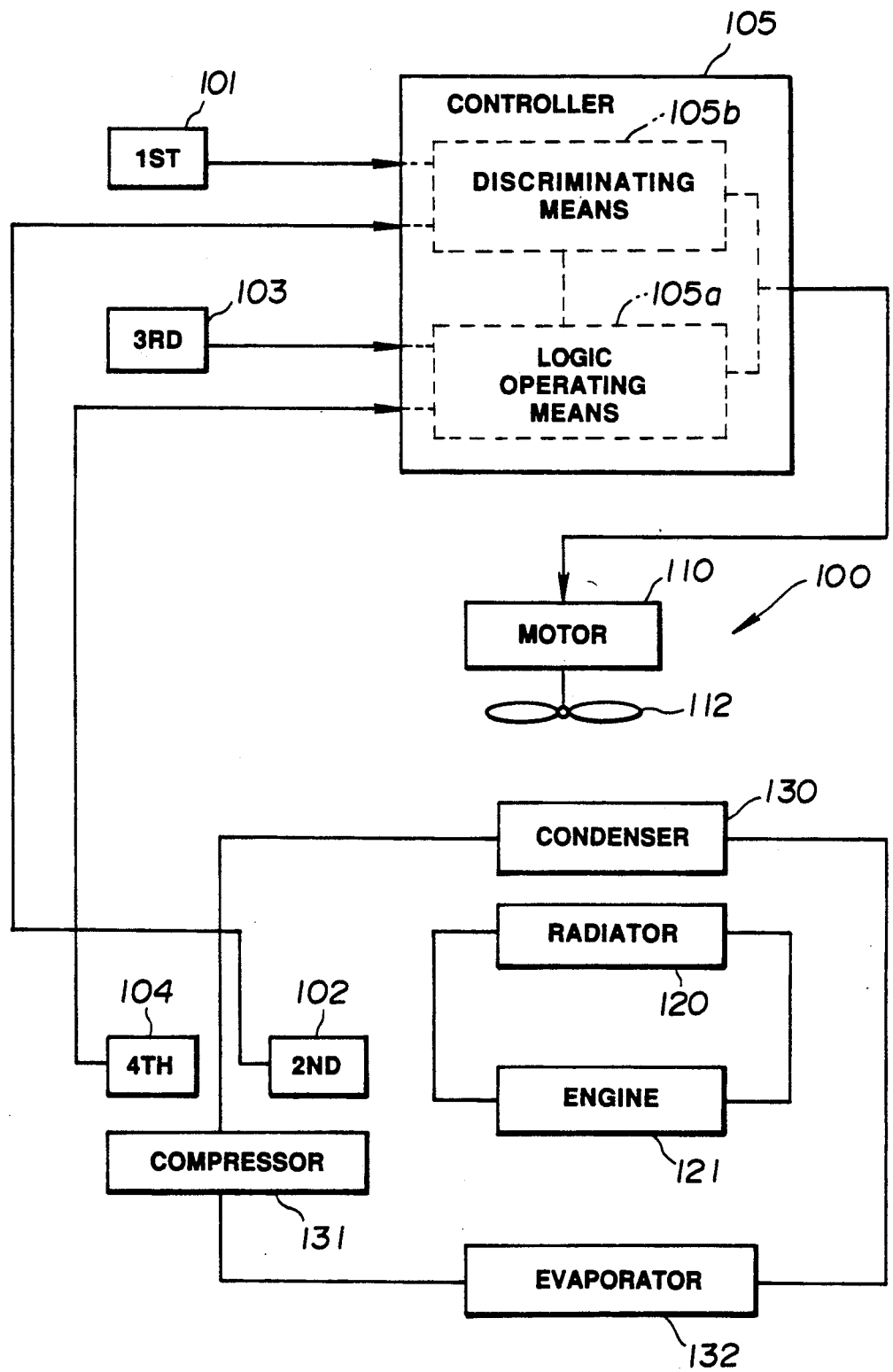
FIG. 1 is a block diagram schematically showing connections of various means employed in an embodiment of the present invention.

As shown in FIG. 1, the fan control system according to the illustrated embodiment of the invention comprises the cooling means 100, the first, second, third and fourth sensing means 101–104, and the controller means 105. The cooling means 100 comprises at least one electric motor 110 drivingly connected with at least one fan 112. The fan 112 is directed to the radiator 120 of the cooling system of the engine 121, and to the condenser 130 of the air conditioning system of the vehicle. The radiator 130 and condenser 120 constitutes an air-cooled heat exchanger system. The radiator 120 is used to remove heat from the engine coolant circulating in the engine cooling system. The condenser 130 is used to remove heat from the refrigerant circulating in the air conditioning system which comprises the condenser 130, compressor 131 and evaporator 132. The controller means 105 is connected with the four sensing means 101–104 so as to receive signals, and produces the fan control signal to control the fan motor 110 in accordance with the signals supplied from the sensing means 101–104. The controller means 105 may comprise the relays Ry1, and Ry2, or some means functioning as these relays may be connected between the controller means 105 and the motor 110.

What is claimed is:

1. A fan control system for a vehicle, comprising: a cooling means comprising an electric motor fan for directing air to an air-cooled heat exchanger system for removing heat from an engine coolant for cooling an engine of the vehicle and a refrigerant of an air conditioning system of the vehicle;

a first sensing means for sensing a vehicle speed of the vehicle;

a second sensing means for sensing a cooling power of said engine, said cooling power being a coolant temperature of said engine coolant;

a third sensing means for determining whether said air conditioning system is an operative state or in an inoperative state:

a fourth sensing means for sensing a discharge pressure of said refrigerant discharged from a compressor of said air conditioning system; and a controller means for switching off said motor fan if said discharge pressure is lower than a predetermined pressure value, regardless of whether said air conditioning system is in said operative state or not, when said vehicle speed is lower than a predetermined first speed value and said coolant temperature of said engine coolant is lower than a predetermined first temperature value.

2. A control system according to claim 1 wherein said third sensing means includes a means for delivering, to said controller means, a first switch-on signal when said air conditioning system is in said operative state and a first switch-off signal instead of said first switch-on signal when said air conditioning system is in said inoperative state, said fourth sensing means includes a means for producing a second switch-on signal when said discharge pressure is higher than a predetermined pressure value, and a second switch-off signal instead of said second switch-on signal when said discharge pressure is lower than said predetermined pressure value, and said controller means includes a means for producing a fan control signal which is in an off control state to switch off said motor fan when at least one of said first and second switch-on signals is absent and which is in an on control state to switch on said motor fan when said first and second switch-on signals are both present.

3. A control system according to claim 2 wherein said controller means includes a means for putting said fan control signal in said on control state regardless of said first and second switch-on and switch-off signals when said coolant temperature is higher than said first temperature value, and putting said fan control signal is said off control state regardless of said first and second switch-on and swich-off signals when said vehicle speed is higher than said first speed value, and said coolant temperature is lower than a predetermined temperature value which is equal to or higher than said first temperature value.

4. A control system according to claim 3 wherein said controller means includes a means for putting said fan control signal in a first on control state to drive said motor fan at a low fan speed when said vehicle speed is between said first speed value and a predetermined second speed value which is lower than said first speed value, and simultaneously said coolant temperature is between said first temperature value and a predetermined second temperature value which is higher than said first temperature value, and in a second on control state to drive said motor fan at a high fan speed higher than said low fan speed when said vehicle speed is between said first and second speed values, and simultaneously said coolant temperature is higher than said second temperature value.

5. A control system according to claim 4 wherein said controller means includes a means for putting said fan control signal in said first on control state when said vehicle speed is lower than said second speed value, and simultaneously said coolant temperature is between said first temperature value and a predetermined third temperature value which is higher than said second temperature value, and in said second on control state when said vehicle speed is lower than said second speed value, and simultaneously said coolant temperature is higher than said third temperature value.

6. A control system according to claim 5 wherein said heat exchanger system comprises a radiator for cooling said engine coolant, and a condenser for cooling said refrigerant.

7. A control system according to claim 6 wherein said third sensing means comprises means for generating said first switch-on and said first switch-off signals in response to an air conditioner switch for switching the air conditioner system of the vehicle on and off and said fourth sensing means comprises means for generating said second switch-on and said second switch-off signals in response to a pressure switch which is switched on when said discharge pressure is higher than said predetermined pressure value.

8. A control system according to claim 7 wherein said controller means includes a means for producing said fan control signal in said first on control state if said first and second switch-on signals are both present when said vehicle speed is lower than said first speed value, and simultaneously said coolant temperature is lower than said first temperature value.

9. A control system according to claim 6 wherein said third sensing means comprises a means for connecting said controller means with an air conditioner switch for switching the air conditioning system of the vehicle on and off.

10. A control system according to claim 2 wherein said controller means comprises a first operating means which produces said fan control signal in said on control state if both of said first and second switch-on signals are present, and said fan control signal in said off control state if either of said first and second switch-on signal is absent, and a second operating means for producing said fan control signal is said on control state, regardless of said switch-on and switch-off signals, when said coolant temperature is higher than said first temperature value, and producing said fan control signal in said off control state, regardless of said switch-on and switch-off signals, when said vehicle speed is higher than said first speed value, and said coolant temperature is lower than a predetermined temperature value which is equal to or higher than said first temperature value.

11. A control system according to claim 2 wherein said controller means comprises a discriminating means for producing a descrimination signal only when said vehicle speed is equal to or lower than said first speed value, and simultaneously said coolant temperature is equal to or lower than a predetermined first temperature value, and an AND logic operating means which, if said first discrimination signal is present, produces said fan control signal which is in said on control state only when said first and second switch-on signals are both present, and which is in said off state when either of said first and second switch-on signals is absent and when both of said first and second switch-on signals are absent.

* * * * *